United States Patent [19]

Laursen

[11] 4,011,629
[45] Mar. 15, 1977

[54] APPARATUS FOR TREATING AN ANIMAL CARCASS
[75] Inventor: Arne Laursen, Roskilde, Denmark
[73] Assignee: Slagteriernes Forskningsinstitut, Roskilde, Denmark
[22] Filed: July 11, 1974
[21] Appl. No.: 487,634
[30] Foreign Application Priority Data
July 17, 1973 Denmark ............................ 3942/73
[52] U.S. Cl. ................................................... 17/17
[51] Int. Cl.² ......................................... A22B 5/08
[58] Field of Search ............. 17/17, 23, 18, 19, 21, 17/14, 16, 13, 1 R, 44

[56] References Cited
UNITED STATES PATENTS

| 708,609 | 9/1902 | Zander | 17/19 |
| 1,834,479 | 12/1931 | Taylor | 17/17 |
| 1,903,877 | 4/1933 | Potter | 17/18 |
| 2,042,273 | 5/1936 | Okun | 17/18 |
| 2,634,457 | 4/1953 | Moyer et al. | 17/23 |
| 3,119,145 | 1/1964 | Weprin | 17/14 |

FOREIGN PATENTS OR APPLICATIONS 591,388 7/1925 France ................................. 17/19

Primary Examiner—Russell R. Kinsey
Assistant Examiner—James D. Hamilton
Attorney, Agent, or Firm—Fleit & Jacobson

[57] ABSTRACT

An apparatus for treating an animal carcass, particularly a slaughtered pig, suspended in a rotatably mounted suspension device, comprising a holder for a tool to treat the animal carcass and apparatus for automatically moving the holder both upward and downward and forward and backward with a controlled force independent of the shape of the carcass.

6 Claims, 1 Drawing Figure

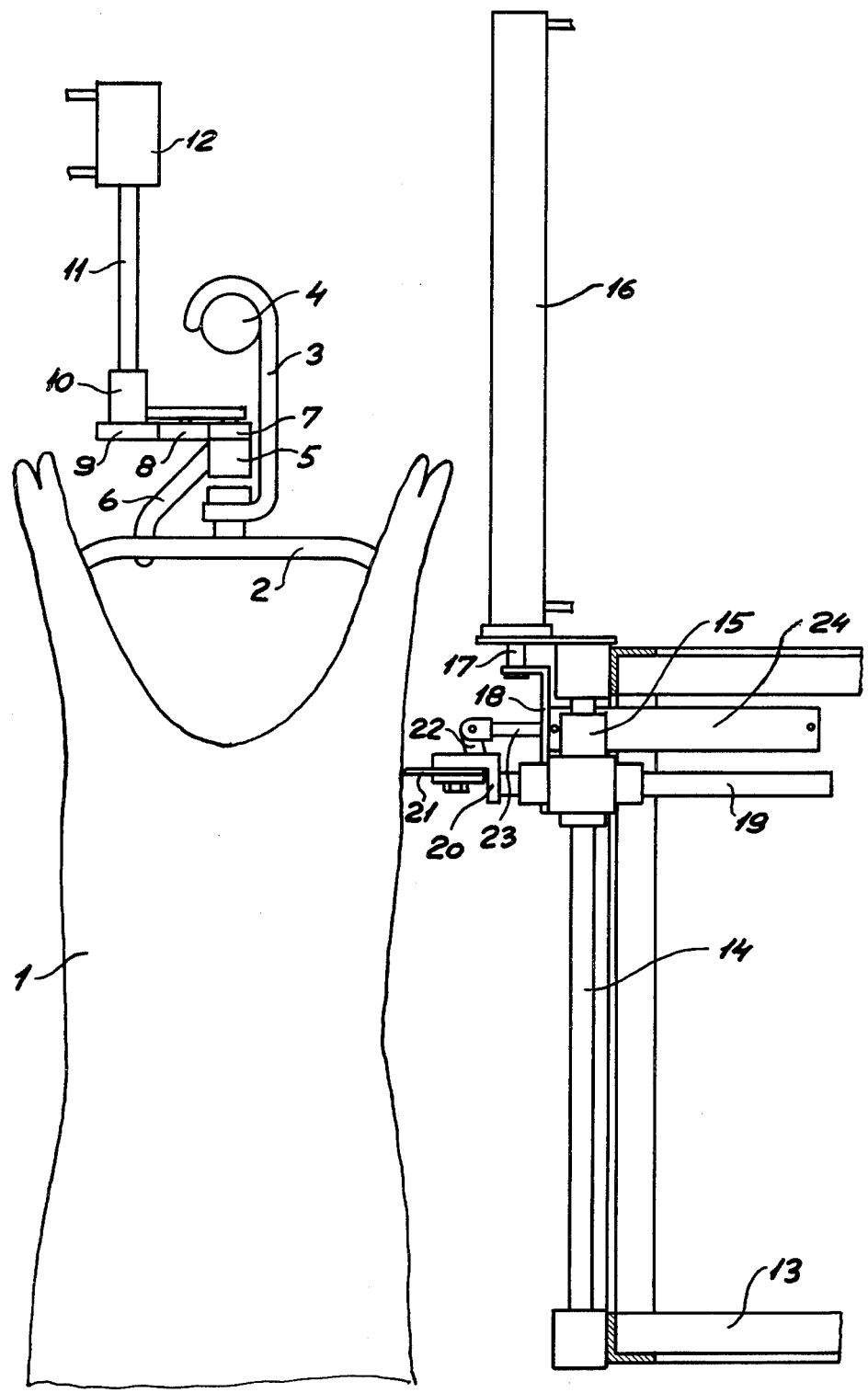

APPARATUS FOR TREATING AN ANIMAL CARCASS

This invention relates to an apparatus for treating an animal carcass, particularly a slaughtered pig, suspended in a rotatably mounted suspension device and is of the type where the suspension device is connected to means for rotation and/or retaining the carcass in position and the apparatus is provided with means for automatically moving a holder for a tool both up and downwards and forward and backward. In slaughterhouses various such apparatus are used, for instance for cutting up, separating from the backbone, scraping and branding, and most of these apparatus, which are normally adapted specifically for one of the said operations, are required to perform reciprocating up and downward movement so that the treatment is carried out during one or the other, possibly during both the said phases of movement.

The scraping, however, generally had to be carried out manually, none of the previously known apparatus being capable of performing this operation with the required efficiency. The scraping of animal carcasses, particularly pigs, aims at removing undesired surface layers, including dead cells, braces of skin diseases or damaged parts of the skin in order to improve the appearance and keeping qualities of the carcass and also to remove any microorganism that might be left in the skin. The scraping is normally made in several steps, first after singing a so called black-scraping, then brushing, while flushing briskly with water, and finally the white-scraping, and it is in particular this white-scraping that has been performed manually.

It is the object of the present invention to provide an apparatus which can be applied for several different operations, and this object has been attained according to the invention by an apparatus where the means for causing the tool holder to perform the forward and backward movement are adapted to exert a resilient, controlled pressure towards the carcass suspended in the yoke during the downward and/or upward movement of the tool holder and independent of the shape of the carcass. Such an apparatus can in theory be used for all the above specified operations simply by mounting the tool required for the desired operation in the said tool holder, for in all such operations the employed tool will have to be carried against the carcass with an accurate and predetermined pressure during the up or downward movement of the tool, and the pressure shall be independent of the shape of the carcass. The apparatus is of an extremely simple construction and therefore easy to keep clean, which is very essential in a slaughterhouse. The apparatus has the further advantage that it can be readily adapted to treat an animal carcass in its entire length. A slaughtered pig is normally suspended head downwards and a manual treatment could therefore rarely be carried out at a stretch from top to bottom, whereas the present apparatus is capable of performing such a longitudinal movement which would be a quite unreasonable physical strain if it should be done manually, and on the whole the work in question is normally very hard and difficult to perform with adequate precision. This refers in particular to the said scraping, which normally involves the use of considerable manual labour, and it requires great skill to be able to perform the said scraping even moderately well. Not even experienced people can perform the scraping with the precision achieved by the apparatus according to the invention. A further advantage of using the described apparatus is that the force exerted against the carcass in the scraping can be maintained absolutely constant and can be adjusted precisely to the need of the various parts of the carcass, which can only be achieved at a certain approximation in manual scraping.

To make the apparatus as simple and robust as possible it will be expedient according to the invention that the means for causing the holder to perform a forward and backward movement comprise a first hydraulic or pneumatic maneuvering cylinder the movable member of which is connected to the holder and that the end of the cylinder from which the said pressure is to be exerted is connected through a control valve to a pressure medium source with controlled pressure. In this construction the mechanically movable members are few and of simple design and the cleaning of the apparatus therefore quite easy. A further advantage is that the pressure exerted by the tool in the holder is resilient so that during the up and downward movement of the holder it will be applied to the carcass with the required force no matter whether the tool meets bulges or dents which necessitate the reciprocating movement of the holder.

During the up and downward working movements the holder will be exposed to the influence of a relatively strong force in a direction opposite to the direction of movement in addition to the pressure exerted by the tool against the carcass, and such forces might be transmitted to the guides supporting the holder. To avoid jamming of the guides or of the maneuvering piston in the cylinder and at the same time ensure a perfect hydraulic or pneumatic control of the apparatus it will be expedient according to the invention that the slide member supports the maneuvering cylinder which causes the holder to perform its reciprocating movement and that the said holder is mounted on a guide rod journalled in the slide member and connected to the movable member of the first maneuvering cylinder, extending parallel to the axis of that cylinder above or beneath the axis corresponding to the upward or downward direction of the working movement.

To further ensure the most correct axial action on piston and guides the axis of the second maneuvering cylinder is parallel-displaced in the direction of the holder in relation to the upstanding guide column.

The said apparatus, as already mentioned, can be used for several different treatments of animal carcasses, but when it is used for scraping, particularly white-scraping, of slaughtered pigs and the holder provided with a tool for scraping the surface of the carcass, the holder may expediently be adapted to retain the scraping member with the plane thereof extending parallel to the axis of the first maneuvering cylinder and staggered with respect thereto in the direction of movement of the holder during the scraping operation. This specific positioning of the scraping tool in the holder of this particular embodiment purports to eliminate the lateral forces to which the scraping tool might be exposed, as mentioned above, and which might jam the guide members supporting the holder. The apparatus will thus be able not only to simulate the manual scraping but to perform the scraping with much greater precision and a perfect adaptation of the pressure against the carcass and with longitudinal movements extending as far as possible from top to bottom of the suspended carcass.

In the treatment of a suspended pig, or in fact any other animal carcass, it will usually be necessary to fix the position of the carcass so that the operation can be performed exactly in the region where it is required, and in a scraping operation it will therefore be necessary to rotate the carcass throughout the process. In a manual scraping operation the rotation too is manual but when using the apparatus according to the invention it will be expedient to provide drive means adapted to be coupled to the suspension arrangement to impart thereto a continuous or stepwise rotation about a vertical axis, so that it will be possible, for instance in a scraping operation, to rotate the carcass continuously or stepwise and thus scrape it all round, or the carcass may in a stepwise rotation be halted at a place where a certain treatment is to be performed so that the apparatus, no matter what job it is to be used for, may be handled purely mechanically. This highly facilitates the work and accelerates the procedure and thus reduces the costs of a substantial part of the work in a slaughterhouse, particularly in the treatment of bacon pigs. Since the apparatus can be used for several different operations it involves the further advantage that a slaughterhouse may install a number of such apparatus and furnish them with different tools so that they can be used for a variety of the time-consuming and manually difficult processes required in the careful handling of slaughtered pigs. Finally it should be noted that the efficiency of the apparatus is so great that the initial black-scraping may often be dispensed with and the whole scraping treatment be carried out in one operation.

The invention will be described below in greater detail and with reference to the drawing which is a schematic presentation of an apparatus according to the invention.

The drawing shows a slaughtered pig 1 suspended in conventional manner in a suspension yoke 2 rotatably mounted in an iron hanger 3 sliding on a rail 4. Concentric with the axis of rotation of the suspension yoke is provided a hub 5 which supports a driver 6 adapted to rotate the pig carcass 1, and in the hub 5 is mounted a gearwheel 7 which is in mesh with a second gearwheel 8 which in turn is in mesh with a gearwheel 9 driven by a hydraulic motor 10 which by means of a piston rod 11 is suspended in connection with a hydraulic cylinder 12 so that the gearwheel arrangement 7, 8, 9 together with the driver 6 can be raised out of disengagement with the suspension yoke 2. Thus it will be possible to pass on the pig carcass, position a new carcass and lower the gearwheel arrangement until the driver 6 engages the yoke and is capable of rotating the carcass. The motor 10 may be adapted in any expedient manner for continuous movement, or it may be controlled to perform stepwise movements so that the carcass 1 can be positioned precisely as required for the treatment to which it is to be subjected.

Beside the carcass is a base plate 13 supporting an upright guide post 14 on which is displaceably mounted a slide member 15 controlled by a hydraulic cylinder 16 whose piston rod 17 is staggered with respect to the guide post 14 towards the carcass 1. The piston rod 17 is connected to the slide member 15 by means of a fitting 18.

In the slide member 15 is journalled a guide rod 19 supporting a holder 20 in which, in the embodiment of the invention illustrated here, is fitted a scraper 21. The holder is connected through an articulation 22 to a piston rod 23 in a hydraulic cylinder 24, which is also secured to the slide member 15. The guide rod 19 is disposed parallel to and below the hydraulic cylinder 24 so that the upward moment produced when the scraper 21 moves downwards to scrape the carcass 1 will be compensated by the moment of rotation exerted by the piston rod 23 through the articulation 22 against the holder 20.

The control of the illustrated hydraulic means may obviously be performed in any expedient manner, and this control, which will normally be performed by means of hydraulic valves and relays, does not form part of the invention but they may be connected to a programming system so that the whole function may be fully automatic. When the apparatus is to be used for scraping, as shown in the drawing, the cylinder 16 will impart downward movement to the slide member 15 and thereby also to the holder 20 and the scraper 21 while at the same time a pressure produced in the cylinder 24 urges the cylinder towards the carcass 1 with the result that the surface of the carcass is scraped with exactly the desired pressure. The pressure may be maintained constant or it may be varied in accordance with the force required for treating different parts of the carcass. When the holder 20 has reached its lowest position the pressure in the cylinder 24 will be relieved and by means of a counter-pressure the holder 20 and the scraper 21 are withdrawn from the carcass while the pressure in the cylinder 16 is shifted to the other end and the holder carried upwards to its top position, and the procedure is repeated. Simultaneously with the return movement of the scraper 21 a rotation may be caused by means of the motor 10 so that the whole of the carcass will be scraped successively. It will be seen from the drawing that in the embodiment shown there the carcass cannot be rotated 360°, but by means of the cylinder 12 the driver 6 can easily be disengaged from the suspension yoke 2 and turned to engage the other end of the yoke, whereupon the rotation of the carcass is continued and all sides thereof treated. If it is desired to rotate the carcass only 180° it will be possible to mount two diametrically opposed scrapers 21 in the illustrated apparatus. Theoretically the scraping can be performed both in upward and downward direction, namely by a suitable adaptation of the control of the hydraulic cylinders, but normally it will be expedient to scrape only downwards in order that the scrapings may subside on the floor without impeding the functioning of the apparatus.

What we claim is:

1. An apparatus for treating an animal carcass, particularly a slaughtered pig, vertically suspended in a rotatably and retainably mounted suspension device comprising, in combination, a holder for a tool to treat the animal carcass, means for mounting the tool on said holder for engagement with the outer surface of the animal carcass, means for guidably supporting said holder for reciprocating movement in a vertical direction and for concomitant movement in a horizontal direction adjacent the animal carcass, means for automatically moving said holder reciprocally in said vertical direction on said supporting means, means for automatically moving said holder yieldingly in said horizontal direction for resilient engagement of the tool in said holder with the outer surface of the animal carcass with a predetermined force throughout variations in the contour of the carcass outer surface during the movement of said holder in the vertical direction.

2. An apparatus according to claim 1, wherein the means for automatically moving said holder in a horizontal direction comprises a first hydraulic maneuvering cylinder assembly the movable member of which is connected to the holder and the cylinder from which the said force is to be exerted is connected through a control valve to a pressure medium source with controlled pressure.

3. An apparatus according to claim 1, wherein the means for automatically moving said holder in a vertical direction comprises a first pneumatic maneuvering cylinder assembly the movable member of which is connected to the holder and the cylinder from which the said force is to be exerted is connected through a control valve to a pressure medium source with controlled pressure.

4. An apparatus according to claim 1, wherein the means for guidably supporting said holder comprises an upstanding guide post on which is displaceably mounted a slide member connected to a first maneuvering cylinder assembly for producing a vertically reciprocating movement of the slide member, and wherein the slide member supports a second maneuvering cylinder assembly to move the holder in a horizontal direction and that the said holder is mounted on a guide rod journalled in the slide member and is connected to the movable member of the second maneuvering cylinder assembly, said guide rod extending parallel to the axis of said second cylinder assembly.

5. An apparatus according to claim 4 wherein the axis of the first maneuvering cylinder assembly is so positioned in relation to the upstanding guide post and to the direction of the holder, that thereby the eccentric moment on the tool is counteracted.

6. An apparatus according to claim 5, and wherein the holder is provided with a scraping tool for scraping the surface of an animal carcass, the holder being further adapted to retain the scraping tool with the plane thereof extending parallel to the axis of the second maneuvering cylinder assembly and staggered with respect thereto in the direction of movement of the holder during the scraping operation.

* * * * *